(12) United States Patent　　　(10) Patent No.: US 9,050,519 B1
Ehlers et al.　　　(45) Date of Patent: Jun. 9, 2015

(54) SYSTEM AND METHOD FOR SHOT TRACKING

(71) Applicant: Callaway Golf Company, Carlsbad, CA (US)

(72) Inventors: Steve Ehlers, Poway, CA (US); Alan Hocknell, Carlsbad, CA (US)

(73) Assignee: Callaway Golf Company, Carlsbad, CA (US)

( * ) Notice: Subject to any disclaimer, the term of this patent is extended or adjusted under 35 U.S.C. 154(b) by 197 days.

(21) Appl. No.: 13/707,283

(22) Filed: Dec. 6, 2012

Related U.S. Application Data

(60) Provisional application No. 61/567,582, filed on Dec. 6, 2011, provisional application No. 61/567,794, filed on Dec. 7, 2011.

(51) Int. Cl.
　　*A63B 69/36*　　(2006.01)
　　*A63B 57/00*　　(2006.01)

(52) U.S. Cl.
　　CPC ................ *A63B 69/36* (2013.01); *A63B 57/00* (2013.01)

(58) Field of Classification Search
　　CPC .................. A63B 69/3632; A63B 2243/0029; A63B 2055/001; A63B 55/00; G01S 19/42
　　USPC ......... 473/223, 407, 409; 340/568.6; 701/469
　　See application file for complete search history.

(56) References Cited

U.S. PATENT DOCUMENTS

2009/0209358 A1\*　8/2009　Niegowski ..................... 473/223
2013/0144411 A1\*　6/2013　Savarese et al. ................. 700/91

\* cited by examiner

*Primary Examiner* — Pierre E Elisca
(74) *Attorney, Agent, or Firm* — Michael A. Catania; Sonia Lari; Rebecca Hanovice

(57) ABSTRACT

A system and method for shot tracking is disclosed herein. The system preferably includes a golf club, a receiver device and a server with a website. The golf club preferably includes an active RFID transponder, a power source and a shock switch. When the golf club strikes a golf ball, the shock switch closes thereby powering the RFID transponder which sends a signal to the receiver device for automatically tracking a golfer's round of golf. The data is then uploaded to the website for processing.

1 Claim, 11 Drawing Sheets

FIG. 8

| my Profile | my Rounds | my Buddies | Competition | my Bag | my Play Stats | my Coach | my Practice Stats |

| my Stats Diagnostics | my Bag Diagnostics | | | | | my Swing Diagnostics | | | | | | |

| Callaway '05 | | | | | | Ping '03 | | | | | Cleveland '03 | |
|---|---|---|---|---|---|---|---|---|---|---|---|---|
| My Bag | Driver | 3W | 5W | 3H | 4 | 5I | 6 | 7 | 8 | 9 | PW | SW | LW |
| Distance | 231 YDS | 221 | 209 | 199 | 181 | 180 | 171 | 162 | 150 | 132 | 125 | 95 | 64 |
| Accuracy | 43% | 8% | 11% | 13% | 9% | 18% | 24% | 35% | 40% | 51% | 61% | 65% | 68% |
| Use/Rounds | 13 | 3 | 2 | 2 | 1 | 2 | 3 | 2 | 4 | 4 | 3 | 2 | 3 |
| Diagnosis | ☐ | ☐ | ☐ | ☐ | ☐ | ☐ | ☐ | ☐ | ☐ | ☐ | ☐ | ☐ | ☐ |

SYSTEM AND METHOD FOR SHOT TRACKING

CROSS REFERENCES TO RELATED APPLICATIONS

The present application claims priority to U.S. Provisional Patent Application No. 61/567,582, filed on Dec. 6, 2011 and U.S. Provisional Patent Application No. 61/567,794, filed on Dec. 7, 2011, both which are incorporated by reference in their entireties.

STATEMENT REGARDING FEDERALLY SPONSORED RESEARCH OR DEVELOPMENT

Not Applicable

BACKGROUND OF THE INVENTION

1. Field of the Invention

The present invention relates to shot tracking. More specifically, the present invention relates to a method and system for tracking shots of a golfer during a round of golf.

2. Description of the Related Art

Golf clubs combine with the players swing to propel a ball toward a favored location and through a favored path. The orientation and speed of the club head at impact largely determines the ball path including carry distance and roll.

Various data measuring and collecting devices and methods are used for analyzing a golf club during a golf swing. In a similar manner, the effectiveness of a golf ball impact with the golf club during the golf swing can be measured in terms of initial launch conditions. Such launch conditions include the initial velocity, launch angle, spin rate and spin axis of the golf ball. These launch conditions are determined principally by the velocity of a club head at impact and the loft and angle of a club face relative to the intended trajectory of the golf ball's flight. There are two general methods for analyzing the golf club during a golf swing: visual analysis and quantitative variable analysis.

The method of analyzing a golf club during a golf swing using visual analysis typically is conducted by a golf instructor capable of visually discerning golf swing variables, and suggesting corrections in the golfer's swing to provide improvement. However, not every golfer has ready access to professional golf instruction. The golfer also can diagnose certain swing faults using visual analysis methodology employing one or more cameras to record the golfer's swing and comparing it to a model swing. Using various camera angles and slow motion play back, the actual swing motion can be reviewed and altered in subsequent swings.

On the other hand, quantitative variable analysis employs sensors to directly measure various mechanical or physical properties of the golf club during the swing motion. Sensors, such as strain gauges or accelerometers, typically are attached to the shaft or the golf club head. Data collected from these strain gauges then may be transferred to a signal processor via wires or radio waves, and can be presented in various graphical formats, including graphical and tabular charts. A significant drawback associated with the use of wires in an instrumented golf club is that the wires can be very cumbersome, and can become obtrusive to the golfer when the golfer attempts to swing the golf club. Several different approaches to analyzing a golf club or baseball bat during a baseball or golf swing using quantitative variable analysis are discussed in the patents listed below.

U.S. Pat. No. 4,759,219, issued to Cobb et al., the specification discloses a baseball bat with a self-contained measuring device and display. A spring potentiometer is used to measure centrifugal force, and an LED or LCD displays the measured force. However, this bat does not contain any data storage capability.

U.S. Pat. No. 5,233,544, issued to Kobayashi, discloses a golf club having multiple sensors, and a cable for transmitting data to a computer for data processing. This arrangement can accommodate up to 5 sensors in a cartridge located in the handle region of the golf club.

U.S. Pat. No. 3,182,508, issued to Varju, discloses the use of a strain gauge in the bottom of a golf club, and a wire for connecting the sensor to a data processing means located separate from the golf club.

U.S. Pat. No. 5,694,340, issued to Kim, discloses the use of multiple sensors for measuring the acceleration of a golf club, and uses either a cable or radio transmissions to transfer data from the sensors to an external data processing means.

U.S. Pat. No. 4,991,850, issued to Wilhelm, discloses the use of a sensor for measuring the applied force of a golf swing. The sensor data can be displayed on a wrist-mounted arrangement or be downloaded to a computer via cable or radio transmission.

U.S. Pat. No. 3,792,863, issued to Evans, discloses the use of multiple sensors, including an accelerometer and strain gauges, to measure torque and flex. Data is transferred from the golf club to a data analysis station via FM radio signals, with each sensor having its own data transfer frequency.

The prior art is lacking in a method and system for shot tracking.

BRIEF SUMMARY OF THE INVENTION

The present invention allows for a golfer to automatically track his or her performance during a round of golf. The golfer can then review the tracked information after the round.

One aspect of the present invention is a system for shot tracking using a plurality of golf clubs with transmitters and a receiver device. The receiver device preferably has a display, a GPS chipset, a memory, a short range transceiver, a processor, a battery and a USB connection port. Shot tracking information is sent from a golf club during a golf shot to the receiver device for processing, storage, and/or display. The receiver device may also have a time function.

Another aspect of the present invention is a system for shot tracking using a plurality of golf clubs with transmitters and a wrist worn golf GPS device. The wrist worn golf GPS device preferably has a display, a GPS chipset, a memory, a short range transceiver, a processor, a battery and a USB connection port. Shot tracking information is sent from a golf club during a golf shot to the golf GPS device for processing, storage, and/or display. The GPS device may also have a time function.

Having briefly described the present invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

Figure 8:
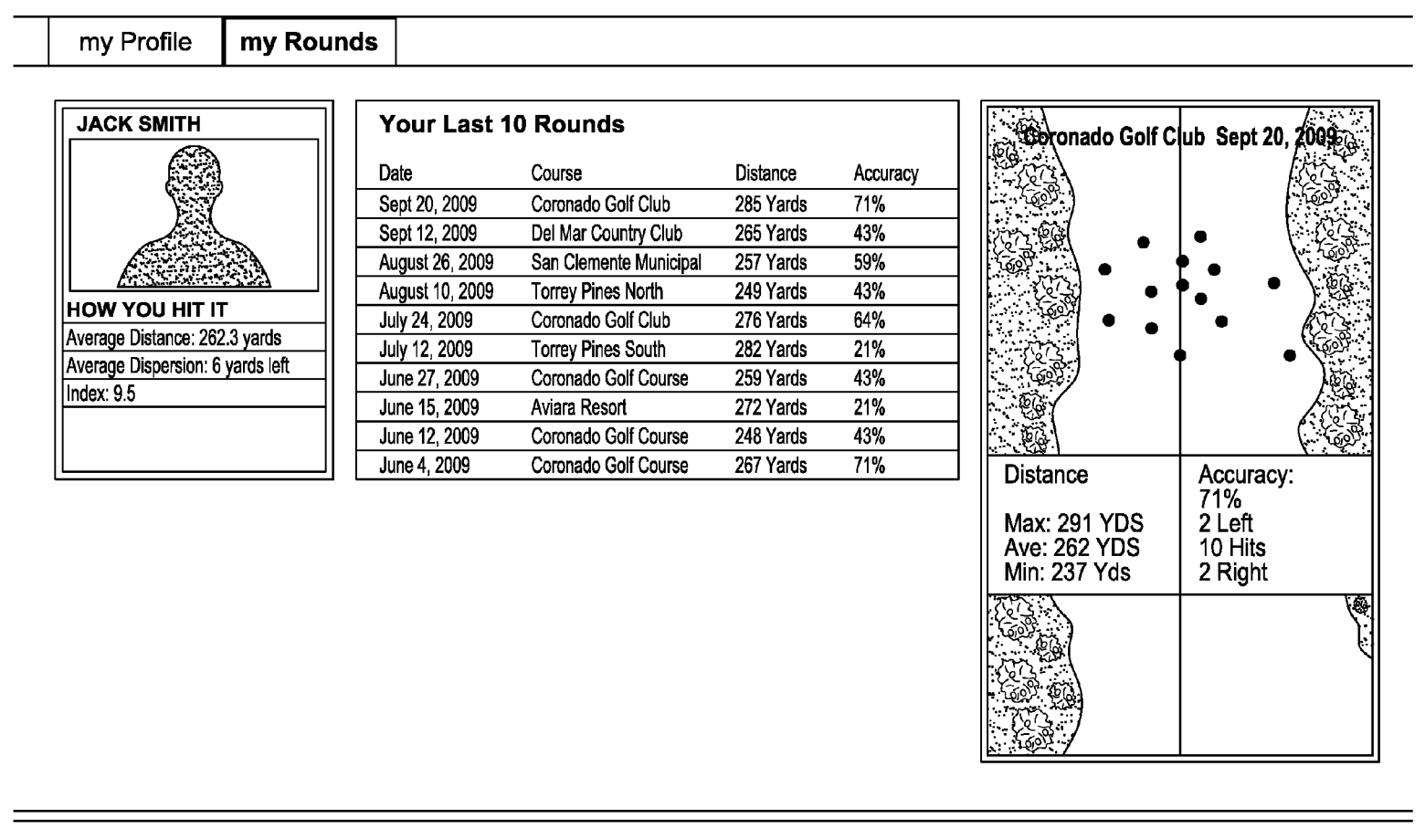

FIG. 8 is an illustration of a webpage for a golfer providing historical performance data.

DETAILED DESCRIPTION OF THE INVENTION

Figure 1:
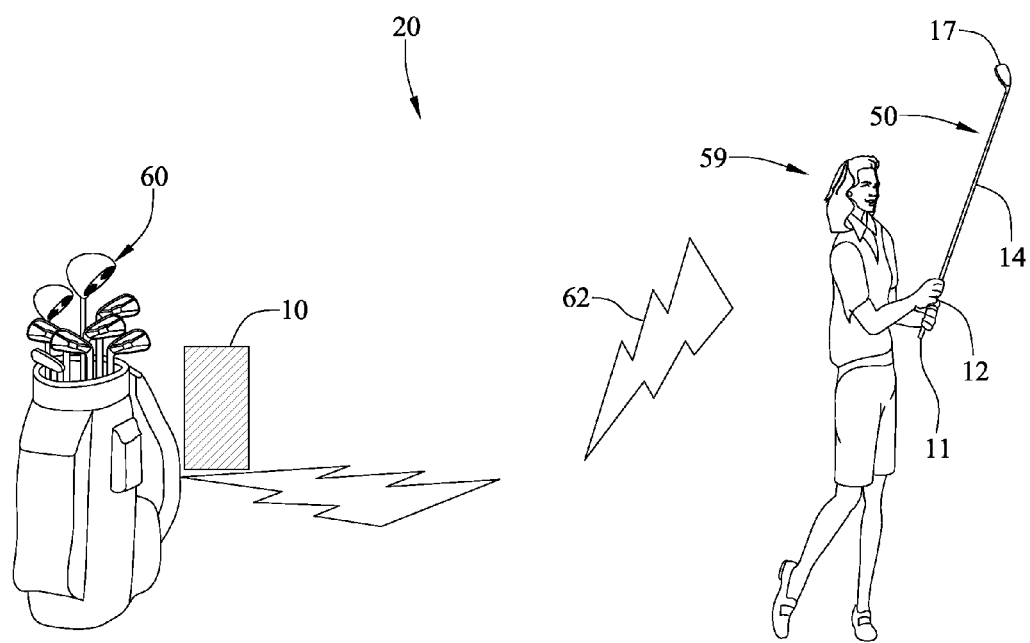
FIG. 1 is a perspective view of a system for shot tracking.
Figure 2:
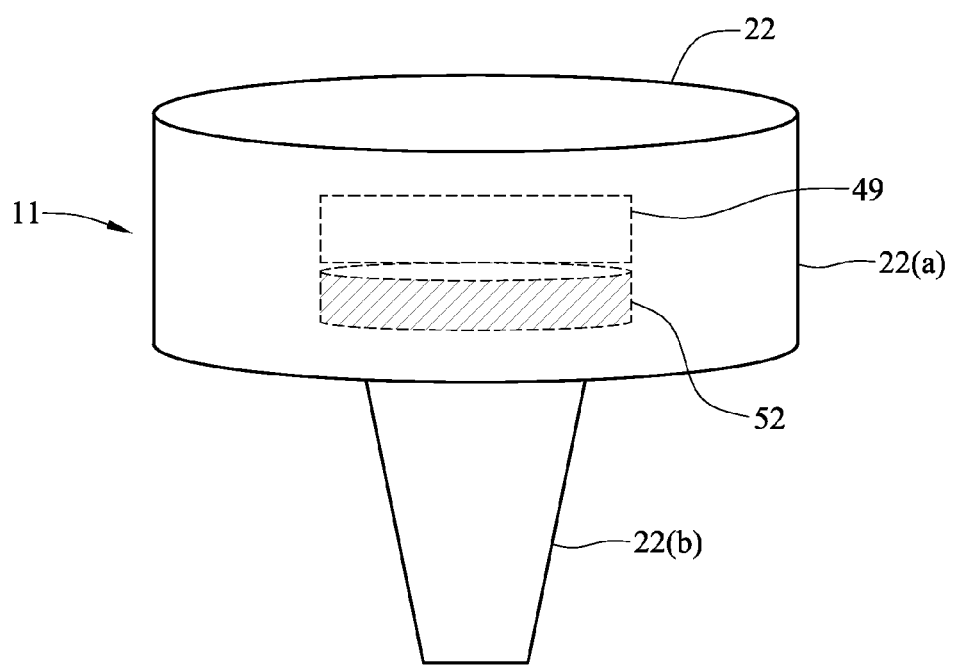
FIG. 2 is a perspective view of a shot tracking device for attachment to a golf club.

As shown in FIG. 1, components of the system can be attached to a golf club. Alternatively, the components can be integrated into a golf club. Greater details on shot tracking are set forth in U.S. Pat. Nos. 7,801,575, 7,800,480, 7,804,404, 7,831,212, 7,847,693, 7,853,211, 7,883,427, 7,883,428, 7,899,408, 7,911,186, 7,915,865, 7,927,225, 7,941,097, 7,946,926 and 8142302, all of which are hereby incorporated by reference in their entireties.

Different levels of acceleration switches can be effectively used to detect that a golf club has been used by a golfer. A 50 g switch, a 125 g switch and a 500 g switch were used for testing.

Figure 3:
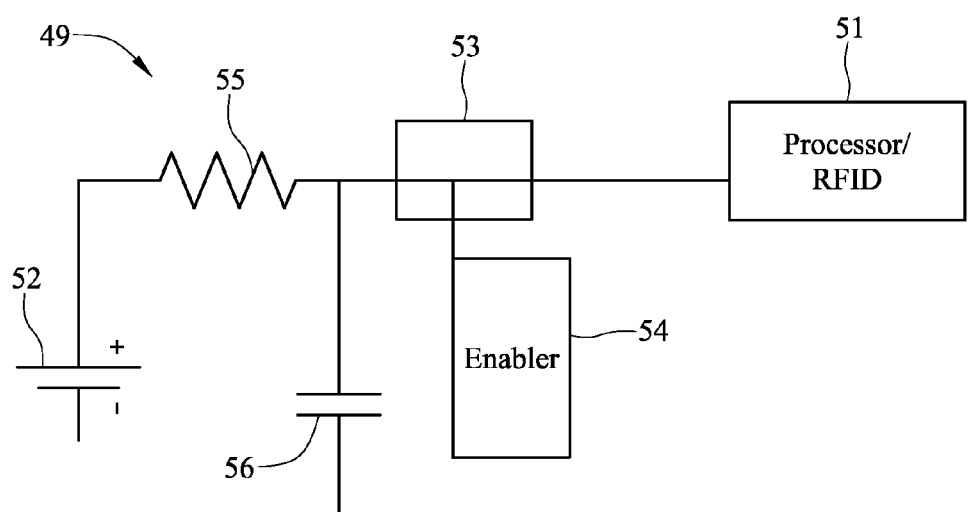
FIG. 3 is a circuit diagram of a shot tracking device.
Figure 4:
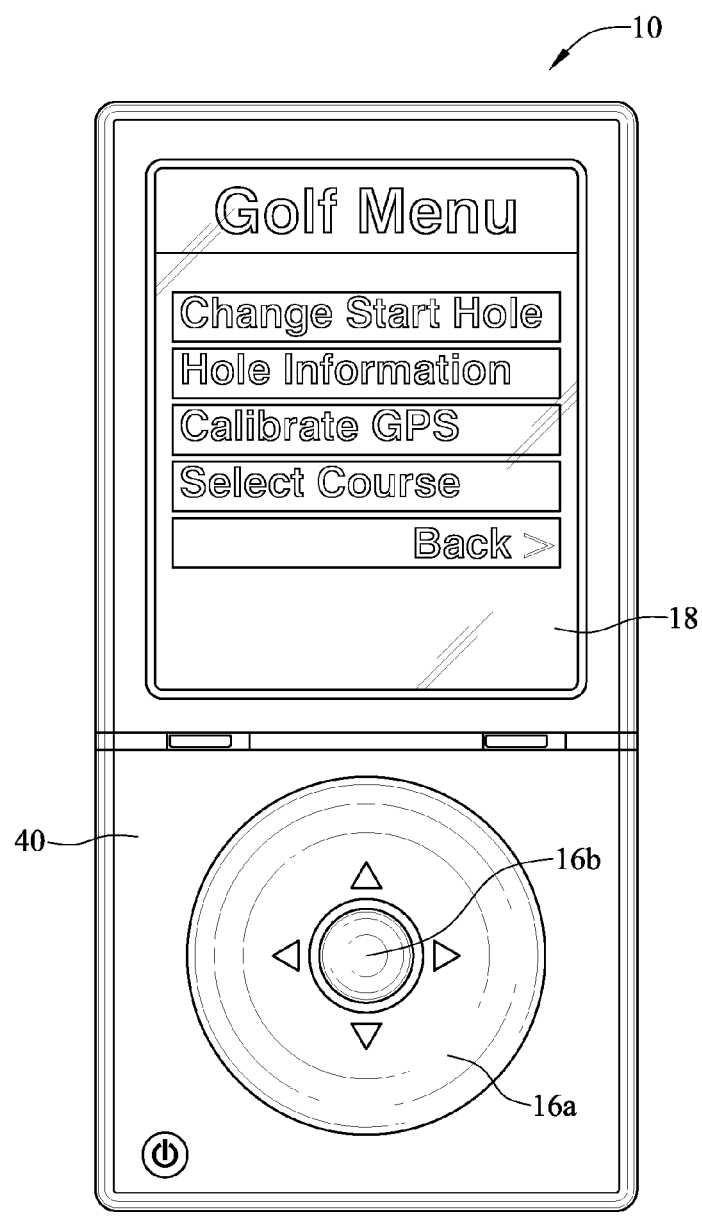
FIG. 4 is a perspective view of a GPS device.

FIG. 3 illustrates a portion of a golf club 50. The components of the system 20 within the golf club 50 preferably include an active RFID transponder 51, a power source 52, a switch 53 and an accelerometer 54. Those skilled in the pertinent art will recognize that the accelerometer and switch may be a single device.

A method 1000 for shot tracking begins with a golfer swinging a club and impacts a golf ball. Diagnostics and an accelerometer are activated by the swing and impact of the golf club with the golf ball. The diagnostics of the golf club measure at least golf club speed. A switch located between a power source and an active RFID transponder is temporarily closed due to the activation of the accelerometer. The active RFID transponder is powered by the power source. The active RFID transponder transmits at least one signal containing data about the golf club which includes the type of club and the club speed. The signal is received at a receiver device. The signal is then stored at the receiver or transmitted to another device.

Figure 5:
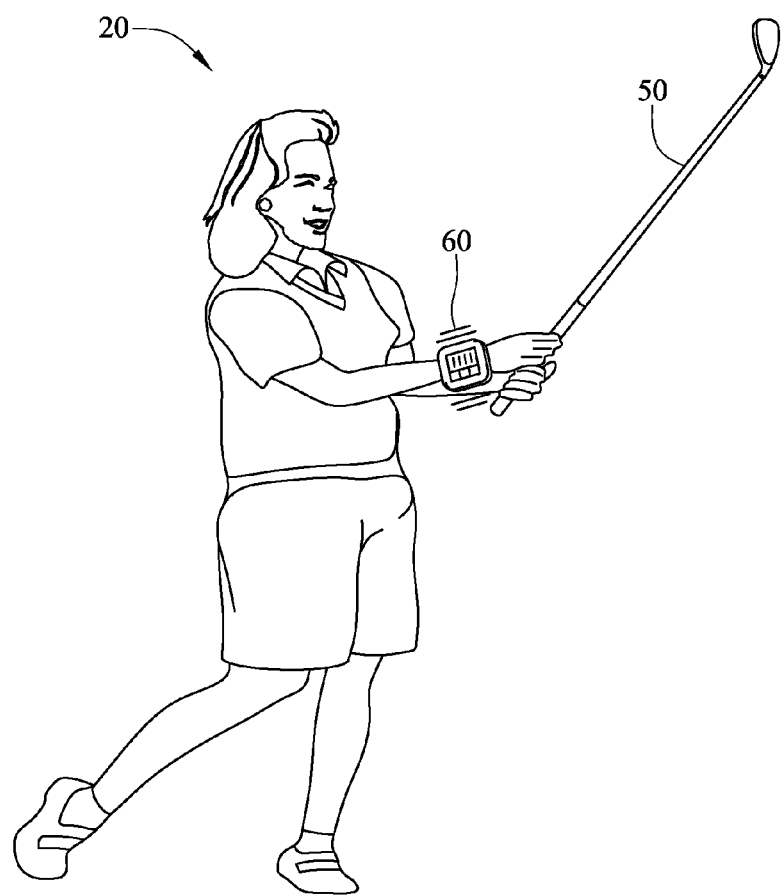
FIG. 5 is an illustration of a system for shot tracking with the golfer wearing a wrist based receiver.

FIG. 5 illustrates the system 20. A transponder in a golf club 50 swung by a golfer sends a signal 62 to a receiver device 60. A wrist worn golf GPS device 60 is capable of wireless transmission using BLUETOOTH communications or a similar communication protocol. The wrist worn golf GPS device 60 may also be capable of storing the data for later transmission. The wrist worn golf GPS device 60 is preferably a GPS device with GPS functions such as disclosed in Balardeta et al., U.S. Patent Publication Number 20090075761 for a Golf GPS Device And System, which is hereby incorporated by reference in its entirety.

Figure 6:
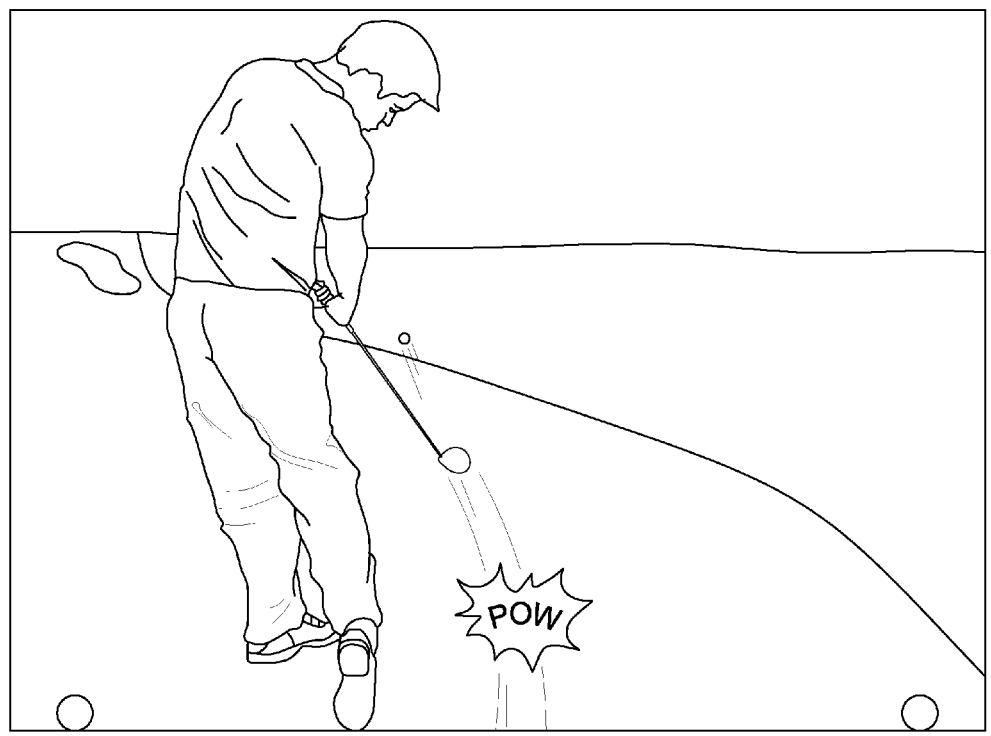
FIG. 6 is an illustration of a golfer striking a golf ball.
Figure 7:
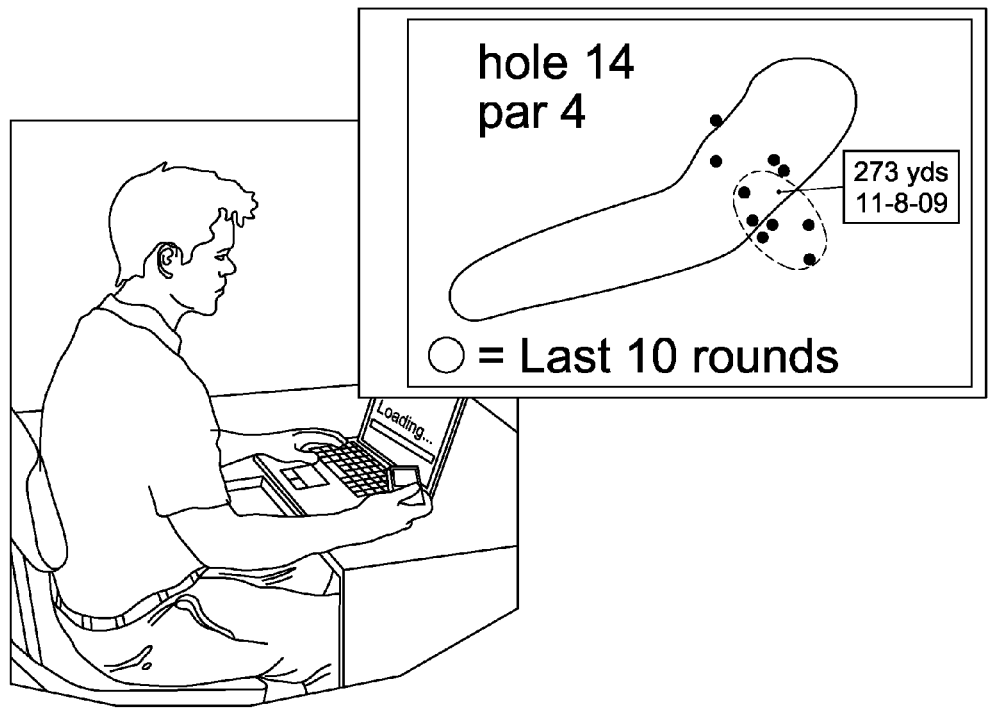
FIG. 7 is an illustration of a golfer at a computer uploading data from a receiver and an inset image of activity by the golfer at a specific hole.
Figure 9:
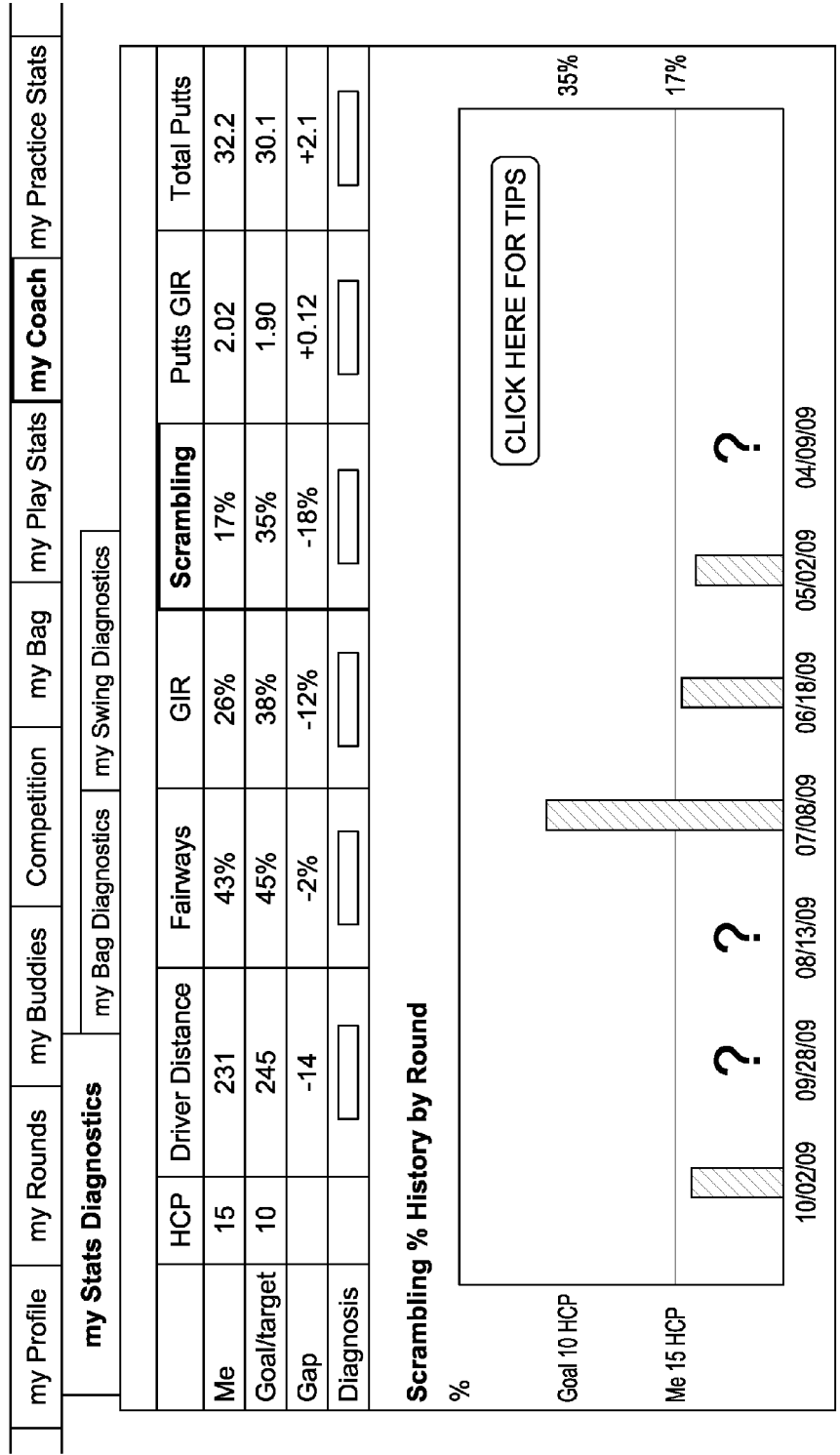
FIG. 9 is an illustration of a webpage for a golfer providing performance data including greens in regulation data, driver distance data, total putts, fairways hit and other data.
Figure 10:
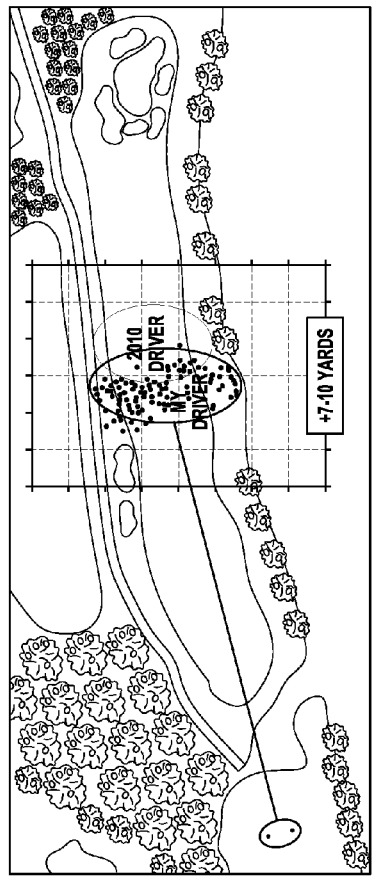
FIG. 10 is an illustration of a webpage for a golfer providing performance data including driver distance data and diagnostic data.
Figure 11:
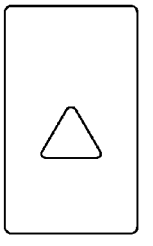
FIG. 11 is an illustration of a webpage for a golfer providing performance data including driver distance data and swing diagnostic data.

FIG. 6 is an illustration of a golfer striking a ball.

FIGS. 7-11 illustrate post-round activity for a golfer.

The receiver device 60 is capable of wireless transmission using BLUETOOTH communications or a similar communication protocol. The receiver device 60 may also be capable of storing the data for later transmission.

The receiver device 60 is preferably a GPS device with GPS functions such as disclosed in Balardeta et al., U.S. Pat. No. 7,942,762 for a GPS Device, which is hereby incorporated by reference in its entirety, or Balardeta et al., U.S. Patent Publication Number 20110046880 for a Golf GPS Device, which is hereby incorporated by reference in its entirety.

Gibbs, et al., U.S. Pat. No. 7,163,468 is hereby incorporated by reference in its entirety.

Galloway, et al., U.S. Pat. No. 7,163,470 is hereby incorporated by reference in its entirety.

Williams, et al., U.S. Pat. No. 7,166,038 is hereby incorporated by reference in its entirety.

Desmukh U.S. Pat. No. 7,214,143 is hereby incorporated by reference in its entirety.

Murphy, et al., U.S. Pat. No. 7,252,600 is hereby incorporated by reference in its entirety.

Gibbs, et al., U.S. Pat. No. 7,258,626 is hereby incorporated by reference in its entirety.

Galloway, et al., U.S. Pat. No. 7,258,631 is hereby incorporated by reference in its entirety.

Evans, et al., U.S. Pat. No. 7,273,419 is hereby incorporated by reference in its entirety.

Hocknell, et al., U.S. Pat. No. 7,413,250 is hereby incorporated by reference in its entirety.

The measurements may be inputted into an impact code such as the rigid body code disclosed in U.S. Pat. No. 6,821,209, entitled Method for Predicting a Golfer's Ball Striking Performance, which is hereby incorporated by reference in its entirety.

The swing properties are preferably determined using an acquisition system such as disclosed in U.S. Pat. No. 6,431,990, entitled System and Method for Measuring a Golfer's Ball Striking Parameters, assigned to Callaway Golf Company, the assignee of the present application, and hereby incorporated by reference in its entirety. However, those skilled in the pertinent art will recognize that other acquisition systems may be used to determine the swing properties.

Other methods that are useful in obtaining a golfer's swing characteristics are disclosed in U.S. Pat. No. 6,638,175, for a Diagnostic Golf Club System, U.S. Pat. No. 6,402,634, for an Instrumented Golf Club System And Method Of Use, and U.S. Pat. No. 6,224,493, for an Instrumented Golf Club System And Method Of Use, all of which are assigned to Callaway Golf Company, the assignee of the present application, and all of which are hereby incorporated by reference in their entireties.

The shaft 114 may be anywhere from 35 inches for a wedge to 50 inches for a driver, and is preferably composed of a graphite material. However, the shaft may also be composed of steel titanium, or a bi-material. The shaft 114 has a wall 122 that defines a hollow interior 123. The shaft 114 has an interior surface 124 and an exterior surface 125. The shaft 114 has a tip end 126 in proximity to the club head 116 and a butt end 127, opposite the tip end 126. The shaft 114 also having an opening 131 to the hollow interior 124 located at the butt end 127. The shaft 114 generally tapers in its diameter from the butt end 127 to the tip end 126.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

The invention claimed is:

1. A system for automatically tracking a golf club swung by a golfer, the system comprising:
   a plurality of golf clubs, each of the plurality of golf clubs comprising a shaft and a golf club head, the shaft having an accelerometer in electrical communication with an active RFID transponder, the accelerometer temporarily closing a switch during impact with a golf ball to provide power from a power source to the RFID transponder for transmission of a signal, wherein the signal comprises the type of club and force of the shot;
   a receiver device for receiving the signal from the RFID transponder, wherein the receiver device comprises a GPS chipset, wherein the receiver device stores data for each shot by the golfer for a round of golf;
   a server comprising a website for receiving uploaded data from the receiver device for each shot by the golfer for a round of golf and for processing the data to provide the golfer with performance data; wherein a webpage of the website is dedicated to the golfer, and wherein the webpage provides historical performance data for the golfer including greens in regulation, driver distance data, total putts and diagnostic data for the golfer.

* * * * *